Jan. 2, 1968   H. C. HARBERS   3,361,445
UNIVERSAL COMPOUND SPRING SUSPENSION FOR VEHICLES
Filed Feb. 7, 1966   2 Sheets-Sheet 1
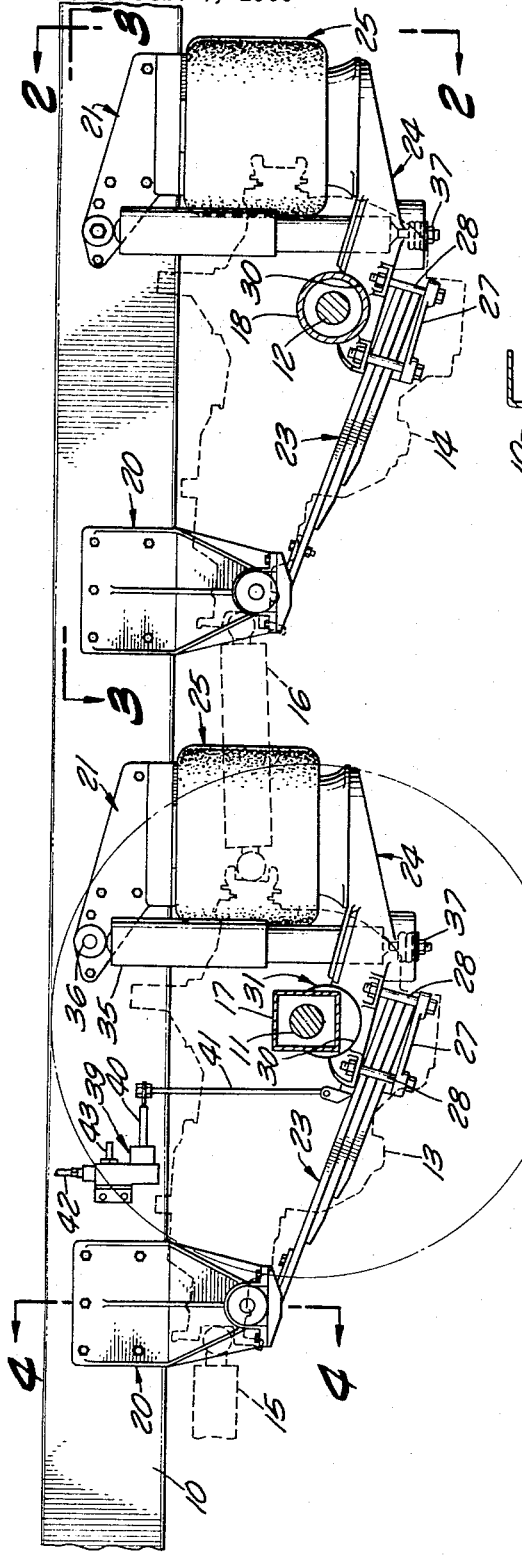
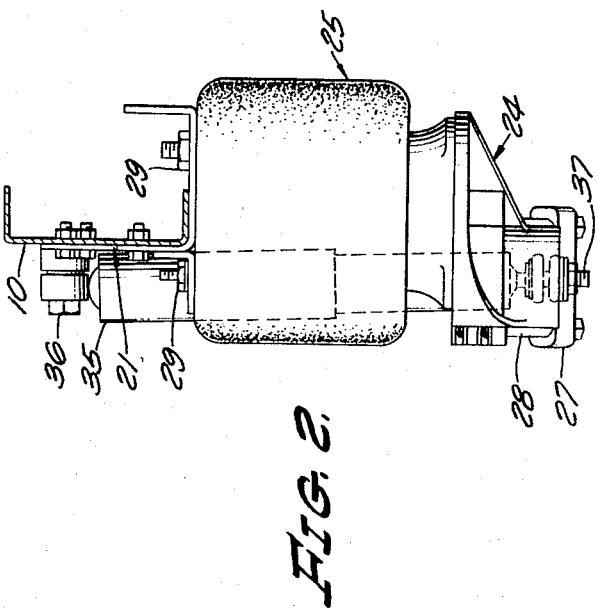
INVENTOR.
HENRY C. HARBERS
BY
ATTORNEY

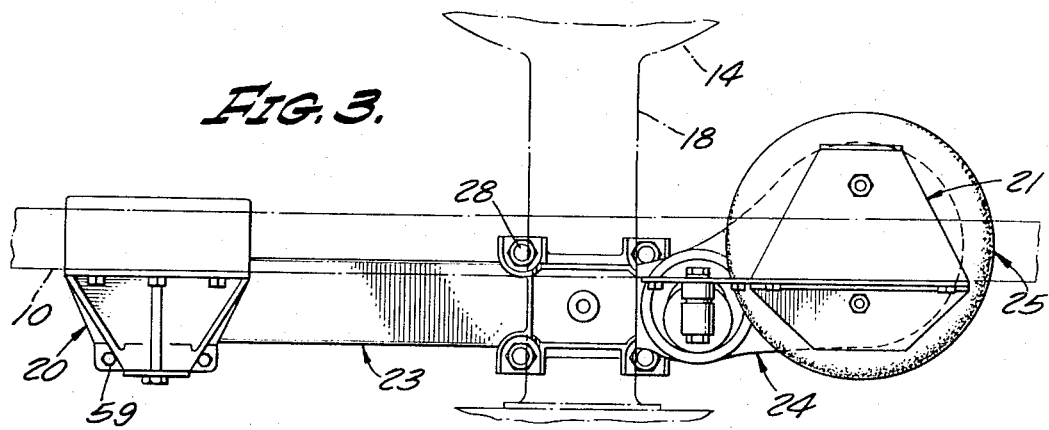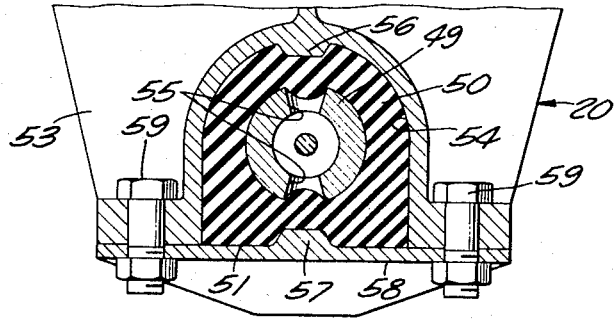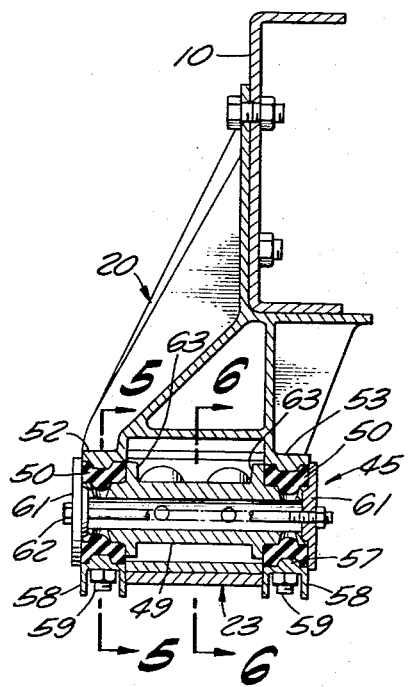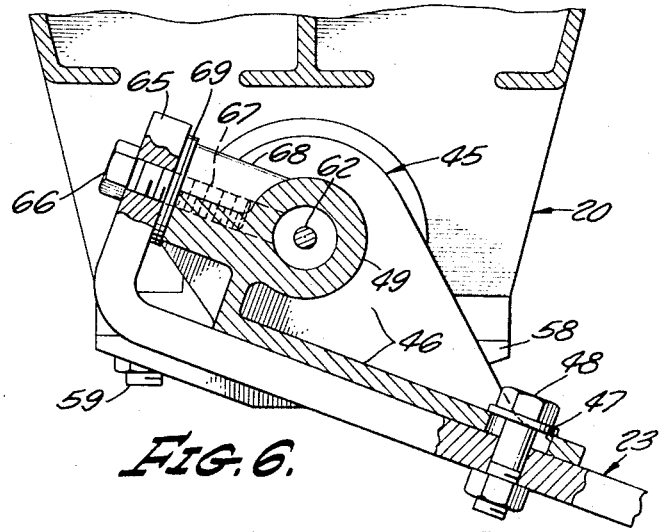

United States Patent Office 3,361,445
Patented Jan. 2, 1968

3,361,445
UNIVERSAL COMPOUND SPRING SUSPENSION
FOR VEHICLES
Henry C. Harbers, Pasadena, Calif., assignor to Western Unit Corporation, City of Industry, Calif., a corporation of California
Filed Feb. 7, 1966, Ser. No. 525,461
5 Claims. (Cl. 280—124)

ABSTRACT OF THE DISCLOSURE

A vehicle suspension assembly is provided featuring a first coupling assembly between the carriage axle unit and the carriage spring and a second coupling assembly between the vehicle frame and the forward end of the carriage spring. The first coupling includes an adapter having a semi-cylindrical exterior adjustably seating in a complementally shaped cooperating coupling component and having a noncircular interior surface shaped to fit against the noncircular exterior of a carriage axle housing. The second coupling features a T-shaped member having its stem secured to the forward end of the carriage spring and its T-head resiliently socketed in the forward hanger and adapted to transmit draft forces and to resist twisting and torsion loads.

---

This invention relates to spring suspension assemblies for vehicles and more particularly to an improved low-height spring suspension capable of providing a softer ride for a wide range of cargo weights and featuring unusual simplicity, versatility, ruggedness and the capability of being used with any of a wide range of carriage and vehicle frame designs.

The present invention represents important improvements and advantages over the spring suspension assembly disclosed in my United States Letters Patent No. 3,237,957, granted Mar. 1, 1966, entitled, Carriage With Compound Spring Suspension Assembly. The present design, though utilizing simpler and lighter weight components, yet by its reliance upon certain unique and improved features, is capable of handling the same wide range of loading and has the same load carrying capabilities as the earlier heavier construction. The present design makes possible use of the same low-height cargo bed without sacrificing load clearance.

Owing to the use of a high capacity air spring in combination with constant height control means, the present spring suspension provides a softer ride for the vehicle while traveling unloaded as well as when fully loaded. A simple inexpensive, lightweight spring beam is combined with the variable capacity air spring and is coupled directly thereto through a short rigid beam having their adjacent overlapping ends rigidly connected together and arranged to underlie the carriage axle housing, the suspension assembly being rigidly connectible thereto through a seating socket formed in the rigid beam. This socket includes a semi-circular upwardly opening recess so designed as to directly seat a conventional circular axle housing and, alternatively, an adapter accommodating carriage designs having odd shaped or non-circular housings. This simple adapter has a non-circular recess for embracing correspondingly shaped axle housing and is provided with an exterior circular surface adapted to seat in the suspension assembly socket in any desired orientation. These simple expedients greatly facilitate the assembly of the present suspension on any of a wide variety of carriage designs by field mechanics and others having limited experience with suspension and carriage assemblies.

Of equal importance is the fact that the present suspension assembly can be mounted on axle housings having pinion drives designed for operation at various inclinations to the horizontal. In this connection, it is pointed out that the differential assemblies of many carriage units are designed for mounting with the drive pinion at different slight inclinations to the horizontal and it is important that the carriage and differential unit be secured to the chassis with this drive pinion at its proper specified angle for reliable and long life operation. This objective is easily accommodated by the suspension assembly of the present invention since its axle housing seating socket can be rotated to any desired angle relative to the differential housing and welded thereto with the assurance that the drive pinion will be supported for operation under maximum efficiency conditions.

Another feature of the present invention is the use of the spring beam both for its resilient load carrying ability and as a draft connection between the associated carriage and the vehicle frame. Its forward end is connected to the frame through torsion coupling providing resilient resistance for both torsional and twisting movements of the carriage relative to the frame and is so effective in this connection as to eliminate the need for a transverse stabilizing bar heretofore thought necessary in suspension assemblies of this general character. The up-turned end of the spring beam is adjustably connected to the coupling through shim means providing the installer with simple means for compensating for manufacturing tolerance variations in aligning the axle properly with respect to the vehicle frame.

A further feature is the connection of the spring beam directly to the adjacent end of the rigid beam and the location of this connection entirely to the underside of the axle thereby greatly simplifying both initial assembly and servicing of the assembly.

Accordingly, it is a primary object of the present invention to provide an improved lighter-weight rugged universal suspension assembly for a cargo vehicle adapted to be installed on a wide range of carriage designs without need for change or adjustments in the suspension itself.

Another object of the invention is the provision of an improved suspension assembly for vehicles comprising a composite resilient unit featuring a spring beam, a rigid beam and an air spring all rigidly coupled together as a unit at the point of manufacture and adapted to be welded assembled to any of a wide range of axle housing designs and configurations.

Another object of the invention is the provision of a spring suspension assembly featuring a composite resilient unit employing a spring beam at its forward end and arranged to be coupled to the chassis frame through a torsion and twist resisting coupling.

Another object of the invention is the provision of a spring suspension assembly for cargo vehicles utilizing a composite spring beam, rigid beam and air spring assembly connected in series and having a junction between the spring beam and the rigid beam disposed entirely on the underside of the axle housing and featuring a socket seat capable of being secured selectively directly to the underside of an axle housing or utilizing an intervening adapter rotatable to a range of angles readily accommodating non-circular axle housings oriented differently as respects a vertical plane therethrough.

These and other more specific objects will appear upon reading the following specification and claims and upon considering in connection therewith the attached drawings to which they relate.

Referring now to the drawings in which a preferred embodiment of the invention is illustrated, FIGURE 1 is a side elevational view partly in section showing a pair of tandem-arranged axle assemblies each provided with a differential assembly in association with a preferred embodiment of the invention spring suspension assembly;

FIGURE 2 is a fragmentary view on an enlarged scale taken along line 2—2 on FIGURE 1;

FIGURE 3 is a fragmentary view on an enlarged scale taken along line 3—3 on FIGURE 1;

FIGURE 4 is a fragmentary view on an enlarged scale taken along line 4—4 on FIGURE 1;

FIGURE 5 is a fragmentary view on an enlarged scale taken along line 5—5 on FIGURE 4; and FIGURE 6 is a fragmentary view on an enlarged scale taken along line 6—6 on FIGURE 4.

Referring initially more particularly to FIGURES 1 and 2 there is shown a typical cargo vehicle frame 10 having its rear end supported by a pair of power driven carriages represented by axles 11 and 12 respectively. It will be understood that each carriage axle is provided with its own differential assembly as indicated in dotted lines at 13 and 14, the forward differential being driven by the main drive shaft 15 and the rear differential mechanism being driven by a connecting power drive shaft 16. Each of the differential assemblies 13 and 14 is generally similar but the forward unit includes a generally rectangular housing 17 whereas the rear unit has a circular axle housing 18. As herein shown, the pinion drive shafts for each of the differentials is similarly inclined to the horizontal. However, it is well known to those skilled in this art that differential assemblies of different manufacturers are designed for installation and operation in a variety of inclinations to the horizontal and varying through a range of ten to fifteen degrees from one another. This does not pose any particular problem if the axle housing is circular as is housing 18 of the rear carriage unit. However, if the axle housing is non-circular as is housing 17 of the forward carriage assembly and if it is important that the differential assembly be rotated until its drive pinion is at some desired angle to the horizontal, then difficulties are encountered in providing a suspension assembly which is equally suitable for securement either to the circular housing 18 or the non-circular housing 17 and particularly where it may be necessary that this non-circular housing lie at a particular inclination for the efficient and effective operation of the different drive pinion. As is made clear in FIGURE 1 of the aforementioned earlier application for patent this problem was resolved by providing specially designed components for each particular axle housing design and necessary for securing spring suspension to each particular shape and design of axle housing. This necessity is completely avoided in the present invention by the simple expedient to be described presently.

The spring suspension components for securing each of the carriages to frame 10 include a forward hanger 20, a rear hanger 21 a spring beam 23, a rigid beam 24, and an air spring 25. Since these components are the same for both carriage units the same reference characters will be employed. The spring suspension units per se may be appropriately described as a composite resilient unit including spring beam 23, rigid beam 24 and air spring beam 25, all rigidly secured together at the place of manufacture. The coupling between beams 23, 24 as here shown includes a pressure plate 27 underlying the rear end of spring beam 23 and secured to the underside of rigid beam 24 by bolts 28. The lower end of air spring 25 is suitably secured to the slightly inturned generally-horizontal rear end of beam 24 and its upper end is secured to rear hanger 21 by fasteners 29.

An important feature of rigid beam 24 is the provision crosswise of its upper forward end of an upwardly opening semicircular socket 30 sized to snugly seat against the underside of circular axle housing 18. It will be understood that in certain vehicles, particularly those of larger capacity having very massive differential assemblies, axle housing 18 may taper to a slightly smaller diameter at its outer end. In this case seat 30 may be tapered lengthwise thereof at a corresponding angle. However, the fact that the socket is so tapered does not interfere with its assembly to an axle housing of tubular configuration since the taper is so slight that the larger gap at the inner end of the socket is easily compensated for by a greater amount of welding metal.

Referring now to the forward carriage assembly represented by axle 11 and having a non-circular housing 17, it is pointed out that a simple unitary adapter casting 31 provided with each suspension assembly is inserted between socket 30 and the axle housing. This adapter is sized and shaped to seat within socket 30 and can be rotated to any particular position therein appropriate to accommodate an axle housing 17 canted to some angle relative to a vertical plane. As appears from FIGURE 1, adapter 31 is provided across its upper side with a non-circular seat shaped to receive and embrace the underside of non-circular housing 17. The adapter is first canted to the proper position to fit and receive a particular axle housing before being welded securely to socket 30. Thereafter axle housing 17 is assembled into the channel extending along the adapter top and welded rigidly into place therein.

Each suspension unit preferably includes a shock absorber 35 here shown mounted in a generally vertical position overlying the forward end of rigid beam 24, its upper end being pivotally connected to hanger 21 by cap screw 36 (FIGURE 2) and its lower end being socketed in beam 24 and held assembled thereto by fastener 37. As is best shown in FIGURE 2, the shock absorber is located in the same general vertical plane as spring beam 23 thereby avoiding applying any twisting force to the spring suspension unit and avoiding the need for mounting brackets heretofore found necessary to connect the shock absorber to the suspension components.

The constant height mechanism includes a valve 39 rigidly secured to frame 10 and an operating control arm 40 connected to the suspension unit through a link 41. This control valve is well known to those skilled in this art and includes a supply pipe 42 leading to a source of pressurized air. A second conduit 43 will be understood as extending from the valve to the interior of each of the air springs 25 and serve to supply pressurized air to the interior of these springs and to convey air back to valve 39 for exhaust to the atmosphere through the usual venting port, not shown, but opening downwardly from the lower end of the valve. When positioned as shown in FIGURE 1, this valve maintains sufficient pressurized air in each of the bellows to supplement spring 23 in supporting a particular load. If the load on the vehicle increases, frame 10 tends to settle thereby pivoting operating control 40 upwardly and admitting additional air to the air bellows. If on the other hand the loading decreases, frame 10 tends to rise away from the carriage axles thereby pivoting control lever 40 downwardly to vent some of the air from the springs to the atmosphere. As the air bellows start to contract, control 40 returns to its normal position wherein air neither enters nor leaves the air spring.

The torsion resisting and twist stabilizing coupling between the forward end of spring beam 23 and hanger 20 will now be described with particular reference to FIGURES 4 to 6. The coupling proper 45 comprises a generally T-shaped casting having a stem 46 overlying and extending lengthwise of the upper side of spring beam 23. This stem is provided with an elongated opening 47 for a fastener bolt 48 used to secure the coupling to spring 23. T-head 49 extends crosswise of the rear end of stem 46 with its opposite ends socketed in rubber rings or collars 50, 50. These collars are generally U-shaped in configuration as viewed from one end and have a flat rim 51 for a purpose to be explained presently. As is made clear by FIGURE 4, forward hanger 20 is bifurcated with downwardly projecting inner and outer sides 52, 53 respectively spaced to straddle the forward end of spring beam 23. Each of sides 52 and 53 are provided with downwardly opening U-shaped sockets 54 with which resilient collars 50 have a forced pressed fit. Desirably the opposite ends of T-head 49 have diametrically disposed openings 55 (FIGURE 5) positioned opposite inwardly projecting bosses 56 and 57 when coupling 45 is in its proper assembled position. Boss 56 projects from the bottom of socket 54 and boss 57 projects inwardly from a strong cover and pressure plate 58 extending across the entrance end of socket 54 and held firmly assembled to hanger 20 by bolts 59. When cover plate 58 is in its assembled position it will be understood that rubber collars 50 are placed under high compressive stress and that bosses 56 and 57 are effective in forcing the rubber to expand into openings 55 of T-head 49. However, it will be understood that openings 55 and bosses 56 and 57 may be omitted if desired and reliance placed upon the compressive forces imposed on the rubber collars by pressure plates 58 to grip the trunnion like ends of T-head 48 and the interior surfaces of sockets 54. Additional compressive forces are imposed upon collars 50 by washers 61, 61 and through bolts 62 (FIGURE 4) and serving to compress the collars from their ends against annular flanges 63 in contact with the interior faces of the collars. Washers 61 and flanges 63 also cooperate in excluding foreign matter and grease from the rubber collars.

As is best shown in FIGURE 6, the forward end of the uppermost leaf of spring beam 23 is turned upwardly at right angles to the beam as indicated at 65 and is provided with openings for cap screws 66 extending into threaded openings 67 in bosses 68 cast integral with T-head 49. These cap screws, acting in concert with bolts 48, secure the spring beams firmly to the coupling. Desirably a group of shims 69 surround the shanks of cap screws 67. A larger or smaller number of shims may be used as necessary to adjust the carriage axle to lie strictly normal to the chassis frame 10 while performing the final assembly and adjusting operation. Once the proper number of shims for this purpose has been ascertained on each side of the vehicle, bolts 48 and cap screws 66 are firmly tightened thereby completing the assembly operation.

As will be appreciated from the foregoing detailed description of couplings 45, these couplings provide a highly effective draft transmitting connection between the forward ends of the composite resilient units 23, 24, 25 and the vehicle frame. The couplings permit limited rotary movement between the spring beams and hangers 20. Also, owing to the length of the T-heads, the presence of the couplings on either side of the vehicle and the use of the rubber collar connections between the ends of the T-heads and the hangers, taken with the lateral rigidity of spring beams 23 and the rigid connection of the latter to the axle housing, the couplings are extremely effective in controlling sidewise movement of the carriage and suspension assembly relative to the vehicle frame.

Attention is also called to FIGURE 2 and the fact that the composite resilient suspension units are positioned closely against the interior side of the chassis frame with the air spring 25 being offset slightly inwardly from the remainder of the composite unit so as to directly underlie the frame with its outermost side wall substantially flush with the outermost components of the suspension unit. This arrangement of the suspension unit requires a minimum of material while providing a maximum of strength relative to the chassis frame and the outer ends of the carriage axle. It also places all components of the composite units as close as possible to the carriage wheels and their associated brake drums.

While the particular universal compound spring suspension for vehicles herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A suspension assembly adapted to be installed on a wide range of vehicle chassis designs to support a cargo bed above a carriage axle unit, said suspension assembly being of the type having spring means interconnecting the vehicle chassis and the carriage axle unit, coupling means for rigidly securing said spring means immovably to the carriage axle unit comprising a member rigidly secured to said spring means intermediate the opposite ends thereof and having a semi-cylindrical recess extending transversely thereof sized to fit snugly against the exterior side of a complementally shaped carriage axle unit, a C-shaped adapter member having a wide semi-cylindrical exterior surface sized to seat snugly in the similarly shaped recess of said first mentioned member and permitting limited rotary movement relative thereto, the interior of said adapter member being sized and shaped to seat snugly against the exterior of a carriage axle unit of noncircular cross-section whereby said spring means is adapted to be assembled selectively to carriage axle units of both noncircular and circular cross sections by welding said first mentioned member directly to a carriage axle unit of circular cross section in the one case and to the exterior of a C-shaped adapter unit welded to a carriage axle unit of noncircular cross-section in the other case.

2. A suspension assembly as defined in claim 1 characterized in that said spring means includes draft means extending forwardly from the carriage axle unit and having means at the forward end thereof for movably connecting the same to the frame of a vehicle chassis, and said spring means further including air spring means extending rearwardly from the carriage axle means and having means for connecting the same to the frame of a vehicle chassis.

3. A suspension assembly as defined in claim 1 characterized in that said spring means includes portions projecting forwardly and rearwardly from said carriage axle unit, means for connecting the opposite ends of said spring means to an adjacent portion of a vehicle chassis frame, said last mentioned means including at the forward draft end thereof resilient torsion coupling means having a T-shaped draft member with its stem portion extending lengthwise of the forward end of said spring means and adjustably secured thereto, hanger means securable to a chassis frame embracing the T-head portion of said T-shaped draft member, resilient torsion means interposed between said hanger means and the opposite ends of said T-head portion, the forward end of said spring means having an upright hooked end engageable with the forward side of said T-head portion, and means detachably securing said upright hooked end to said T-head and effective to transmit draft torsion and sidewise twisting loads acting on the carriage unit to the vehicle frame.

4. A suspension assembly as defined in claim 3 characterized in that said means detachably securing said upright hooked end to said T-head includes a shim pack which can be changed in size as found desirable to align the carriage axle unit accurately normal to the length of a vehicle chassis.

5. A suspension assembly as defined in claim 3 characterized in that said resilient torsion means includes compressed rubber ring means interposed between said hanger means and the adjacent ends of said T-head.

References Cited

UNITED STATES PATENTS 3,237,957  3/1966  Harbers _____ 280—124 X
3,233,915  2/1966  Hamlet _____ 267—32 X
3,117,772  1/1964  Brown _____ 267—54

BENJAMIN HERSH, *Primary Examiner.*

PHILIP GOODMAN, *Examiner.*